United States Patent
Piao

(10) Patent No.: US 12,299,569 B2
(45) Date of Patent: May 13, 2025

(54) LEARNING APPARATUS, A LEARNING METHOD, OBJECT DETECTING APPARATUS, OBJECT DETECTING METHOD, AND RECORDING MEDIUM

(71) Applicant: NEC Corporation, Tokyo (JP)

(72) Inventor: Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 439 days.

(21) Appl. No.: 17/765,489

(22) PCT Filed: Oct. 10, 2019

(86) PCT No.: PCT/JP2019/040015
§ 371 (c)(1),
(2) Date: Mar. 31, 2022

(87) PCT Pub. No.: WO2021/070324
PCT Pub. Date: Apr. 15, 2021

(65) Prior Publication Data
US 2022/0366248 A1 Nov. 17, 2022

(51) Int. Cl.
*G06N 3/08* (2023.01)
*G06V 10/77* (2022.01)
*G06V 10/82* (2022.01)

(52) U.S. Cl.
CPC ........... *G06N 3/08* (2013.01); *G06V 10/7715* (2022.01); *G06V 10/82* (2022.01)

(58) Field of Classification Search
CPC ........... G06N 3/08; G06N 3/09; G06N 20/00; G06V 10/7715; G06V 10/82; G06V 10/454; G06V 10/776; G06V 10/806; G06T 7/00

USPC .......................................................... 382/155
See application file for complete search history.

(56) References Cited

U.S. PATENT DOCUMENTS

| | | | |
|---|---|---|---|
| 10,397,497 B1 * | 8/2019 | Graves | G01S 17/89 |
| 2012/0236162 A1 * | 9/2012 | Imamura | H04N 23/62 348/207.99 |
| 2017/0243077 A1 | 8/2017 | Fukui et al. | |
| 2018/0137336 A1 * | 5/2018 | Shoda | G06V 10/765 |
| 2018/0300885 A1 | 10/2018 | On | |
| 2019/0071100 A1 | 3/2019 | Xavier | |
| 2019/0213451 A1 | 7/2019 | Schäfer et al. | |

(Continued)

FOREIGN PATENT DOCUMENTS

| | | |
|---|---|---|
| JP | 2012-199675 A | 10/2012 |
| JP | 2017-146840 A | 8/2017 |
| JP | 2018-081404 A | 5/2018 |

(Continued)

OTHER PUBLICATIONS

International Search Report for PCT Application No. PCT/JP2019/040015, mailed on Dec. 24, 2019.

(Continued)

*Primary Examiner* — Ali Bayat
(74) *Attorney, Agent, or Firm* — Sughrue Mion, PLLC

(57) ABSTRACT

A learning apparatus includes an environment information acquisition unit and a learning unit. The environment information acquisition unit acquires environment information concerning a learning image. The learning unit detects an object detection model that detects each target object included in the learning image by using the environment information.

21 Claims, 11 Drawing Sheets

(56) References Cited

U.S. PATENT DOCUMENTS

2022/0269910 A1* 8/2022 Onzon .................. G06N 3/045

FOREIGN PATENT DOCUMENTS

| JP | 2019-043495 A | 3/2019 |
| JP | 2019-104331 A | 6/2019 |
| WO | 2017/109854 A1 | 6/2017 |

OTHER PUBLICATIONS

Girshick, R., "Fast R-CNN", Proceedings of the 2015 IEEE International Conference on Computer Vision (ICCV), Dec. 13, 2015, pp. 1440-1448, ISBN: 978-1-4673-8391-2.

Nagato, T. et al., "Machine Learning Technology Applied to Production Lines: Image Recognition System", [online], Fujitsu Scientific and Technical Journal (FSTJ), vol. 53, No. 4, Jul. 2017, pp. 52-58.

Nagato, T. et al., "Machine Learning Technology Applied to Production Line: Image Recognition System", [on line], Fujitsu, vol. 67, No. 3, May 2016, pp. 66-72.

JP Office Action for JP Application No. 2021-551039, mailed on Mar. 14, 2023 with English Translation.

Kido Kaichi et al., "Running Environment Recognition by Depths Learning Algorithm Using P-5-15 Adaptation Environment Data", PCSJ/IMPS 2017 Proceedings, Nov. 20, 2017 (Date of Issue), Institute of Electronics, Information and Communication Engineers an image engineering research special committee, pp. 196-197.

Shaoqing Ren, et al., "Faster R-CNN: Towards Real-Time Object Detection with Region Proposal Networks", IEEE Transactions on Pattern Analysis and Machine Intelligence, vol. 39, No. 6, Jun. 6, 2016, pp. 1137-1149.

JP Office Action for JP Application No. 2021-551039, mailed on Jan. 16, 2024 with English Translation.

Yasufumi Tsurutani et al., "Estimation of the Environmental Situation of the Road Image Using a Self-Organizing Map", Proceedings of the 49th Annual Conference of the Institute of Systems, Control and Information Engineers, May 18, 2005, pp. 273-pp. 274.

* cited by examiner

LEARNING APPARATUS, A LEARNING METHOD, OBJECT DETECTING APPARATUS, OBJECT DETECTING METHOD, AND RECORDING MEDIUM

This application is a National Stage Entry of PCT/JP2019/040015 filed on Oct. 10, 2019, the contents of all of which are incorporated herein by reference, in their entirety.

TECHNICAL FIELD

The present disclosure relates to a technique for detecting an object included in an image.

BACKGROUND ART

Recently, various object detection a techniques using machine learning have been proposed. A general object detection technique specifies areas of one or more target objects included in an image, and outputs a label for each target object and coordinates of each area. Patent Document 1 discloses an example of such an object detection method.

PRECEDING TECHNICAL REFERENCES

Patent Document

Japanese Laid-open Patent Publication No. 2017-146840

SUMMARY

Problem to Be Solved

However, an object detection apparatus as described above conducts learning without considering a complicated environment, different appearances of a target object, variation of a type of the target object, and the like. Accordingly, there is a problem that an influence of an environment on an image cannot be learned well and a detection accuracy is reduced.

It is one object of the present disclosure to provide an object detection method that enables highly accurate detection in consideration of the influence of the environment on the image.

Means for Solving the Problem

In order to solve the above problems, according to an example aspect of the present disclosure, there is provided a learning apparatus including:
  an environment information acquisition unit configured to acquire environment information concerning a learning image; and
  a learning unit configured to train an object detection model that detects each target object included in the learning image, by using the environment information.

According to another example aspect of the present disclosure, there is provided a learning method including:
  acquiring environment information concerning a learning image; and
  detecting each target object included in the learning image by using the environment information.

According to still another example aspect of the present disclosure, there is provided a recording medium storing a program, the program causing a computer to perform a process including:
  acquiring environment information concerning a learning image; and
  detecting each target object included in the learning image by using the environment information.

According to a further example aspect of the present disclosure, there is provided an object detection apparatus including:
  an environment information generation unit configured to generate environment information from an image; and
  a detection unit configured to detect each target object included in the image by using the environment information, and output a detection result.

According to still further example aspect of the present disclosure, there is provided an object detection method including:
  generating environment information from an image; and
  detecting each target object included in the image by using the environment information, and outputting a detection result.

According to yet still another example aspect of the present disclosure, there is provided a recording medium storing a program, the program causing a computer to perform a process including:
  generating environment information from an image; and
  detecting each target object included in the image by using the environment information, and outputting a detection result.

According to another example aspect of the present disclosure, there is provided an object detection apparatus including:
  a feature extraction unit configured to extract features from an image; and
  a detection unit configured to detect each target object included in the image based on the extracted features, and output a detection result including a label, coordinate information, and environment information for each target object.

According to still another example aspect of the present disclosure, there is provided an object detection method including:
  extracting features from an image; and
  detecting each target object included in the image based on the extracted features, and outputting a detection result including a label, coordinate information, and environment information for each target object.

According to further example aspect of the present disclosure, there is provided a recording medium storing a program, the program causing a computer to perform a process including:
  extracting features from an image; and
  detecting each target object included in the image based on the extracted features, and outputting a detection result including a label, coordinate information, and environment information for each target object.

Effect

According to the present disclosure, it is possible to provide an object detection technique that enables highly accurate detection in consideration of an influence of an environment on an image.

EXAMPLE EMBODIMENTS

In the following, example embodiments will be described with reference to the accompanying drawings.

FIRST EXAMPLE EMBODIMENT (Hardware Configuration)

Figure 1:
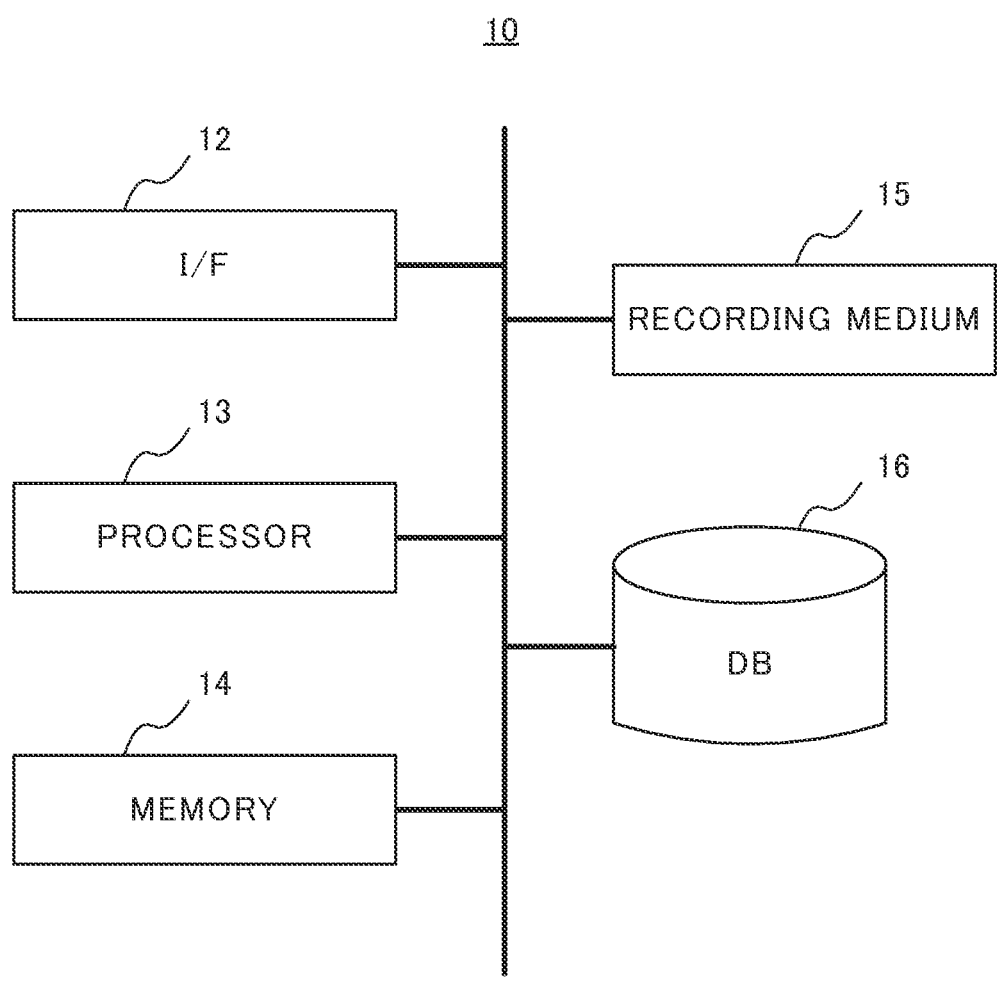
FIG. 1 illustrates a hardware configuration of an object detection apparatus according to a first example embodiment.

FIG. 1 is a block diagram illustrating a hardware configuration of an object detection apparatus according to a first example embodiment. As illustrated, an object detection apparatus 10 includes an interface (I/F) 12, a processor 13, a memory 14, a recording medium 15, and a database (DB) 16.

The interface 12 inputs and outputs data to and from an external apparatus. Specifically, a learning data set used for learning of the object detection apparatus 10 and image data to be a subject to an object detection are input through the interface 12.

The processor 13 is a computer such as a CPU (Central Processing Unit) or a GPU (Graphics Processing Unit) with a CPU, and controls the entire object detection apparatus 10 by executing a program prepared in advance. Specifically, the processor 13 executes a learning process and an object detection process, which will be described later.

The memory 14 is composed of a ROM (Read Only Memory), a RAM (Random Access Memory), or the like. The memory 14 stores an object detection model which the object detection apparatus 10 trains. Also, the memory 14 is used as a working memory during executions of various processes by the processor 13.

The recording medium 15 is a non-volatile and non-transitory recording medium such as a disk-shaped recording medium or a semiconductor memory, and is formed to be detachable from the object detection apparatus 10. The recording medium 15 records various programs executed by the processor 13. When the object detection apparatus 10 executes various kinds of processes, programs recorded on the recording medium 15 are loaded into the memory 14 and executed by the processor 13.

The database 16 stores a learning data set used for learning and image data to be a subject to the object detection. In addition to the above, the object detection apparatus 10 may include an input device or a display unit such as a keyboard or a mouse for a user to perform instructions or inputs.

FIRST EXAMPLE EMBODIMENT

First, a first example embodiment of an object detection apparatus will be described. In the first example embodiment, environment information is used as an input of the object detection apparatus.

(1) Learning Apparatus

Figure 2:
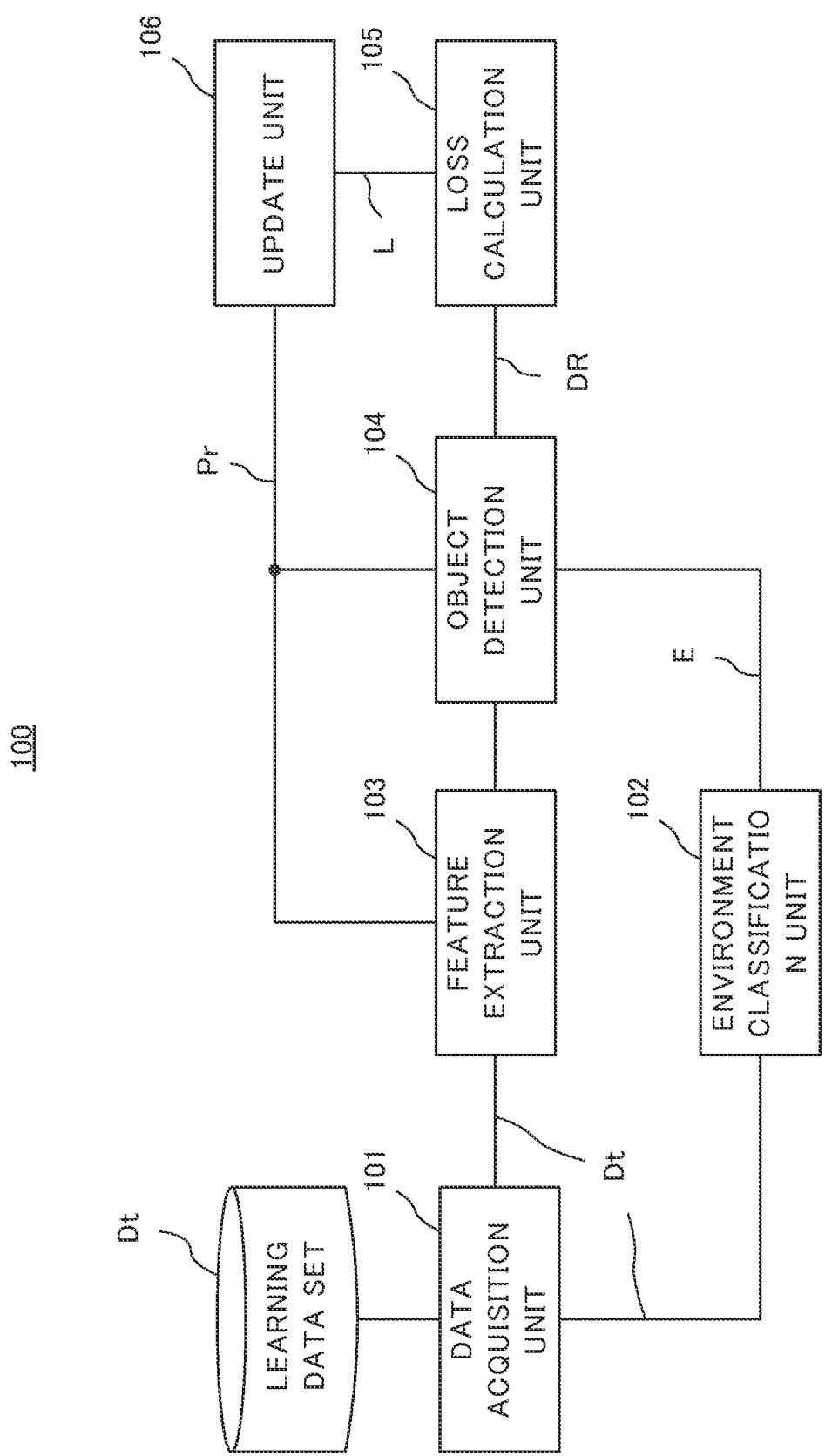
FIG. 2 illustrates a functional configuration of a learning apparatus that trains the object detection apparatus according to the first example embodiment.

First, a functional configuration of the learning apparatus of the first example embodiment will be described. FIG. 2 is a block diagram illustrating a functional configuration of a learning apparatus 100 that trains the object detection apparatus according to the first example embodiment. The learning apparatus 100 includes a data acquisition unit 101, an environment classification unit 102, a feature extraction unit 103, an object detection unit 104, a loss calculation unit 105, and an update unit 106.

At a time of learning, a learning data set Dt prepared in advance is used. The learning data set Dt includes learning image data and correct answer data prepared for the learning image data. An object (hereinafter, referred to as "target object") that the object detection apparatus detects from the image data is predetermined, and the correct answer data include labels and coordinates for one or more target objects included in the learning image data.

The data acquisition unit 101 acquires the learning data set Dt and supplies the learning data set Dt to the environment classification unit 102 and the feature extraction unit 103. The environment classification unit 102 classifies an environment related to the image data based on the learning image data included in the learning data set Dt, and generates environment information E. The environment information E will be described in detail later. The environment classification unit 102 supplies the generated environment information E to the object detection unit 104.

The feature extraction unit 103 extracts features from the learning image data included in the learning data set Dt and supplies the features to the object detection unit 104. The object detection unit 104 detects one or more target objects included in the learning image data using the features extracted by the feature extraction unit 103 and the environment information E generated by the environment classification unit 102. The feature extraction unit 103 and the object detection unit 104 are formed by a neural network that performs an object detection using a predetermined object detection model. The object detection model may be algorithms such as a R-CNN, a SPPs (Spatial Pyramid Pooling) net, a Fast R-CNN (Convolutional Neural Network), a YOLO (You Only Look Once), a SSDs (Single Shot Multibox Detector), a YOLOv2, a DSSD (Deconvolutional Single Shot Multibox Detector), a M2Det, or the like. The environment information E output from the environment classification unit 102 is input as input data to a portion corresponding to the object detection unit 104 in the neural network.

The object detection unit 104 outputs labels and coordinate information concerning one or more object objects detected from the learning image data as a detection result DR. Here, the "label" indicates which of the target objects that object is, and the "coordinate information" indicates a position of the object in the learning image data. The object detection unit 104 supplies the detected label and the coordinate information for each target object to the loss calculation unit 105 as the detection result DR.

The loss calculation unit 105 calculates a loss L between the detection result DR supplied from the object detection unit 104 and the correct answer data included in the learning data set Dt, and supplies the loss L to the update unit 106. Specifically, the loss calculation unit 105 calculates a loss (referred to as "classification loss") between the label output by the object detection unit 104 as a detection result and the correct answer label included in the correct answer data. Moreover, the loss calculation unit 105 calculates a loss (referred to as "regression loss") between the coordinate information output by the object detection unit 104 as a detection result and the coordinate information included in the correct answer data. After that, the loss calculation unit 105 supplies the loss L including the classification loss and the regression loss to the update unit 106.

The update unit 106 updates the object detection model formed by the feature extraction unit 103 and the object detection unit 104, specifically, parameters of the neural network, so that the loss L supplied from the loss calculation unit 105, that is, the classification loss and the regression loss are reduced. Next, the update unit 106 supplies the updated parameters Pr to the feature extraction unit 103 and the object detection unit 104. By these processes, the learning apparatus 100 trains the object detection model including the feature extraction unit 103 and the object detection unit 104. Note, in the above configuration, the environment classification unit 102 is an example of an environment information acquisition unit, and the feature extraction unit 103, the object detection unit 104, the loss calculation unit 105, and the update unit 106 are element examples of a learning unit.

Figure 3:
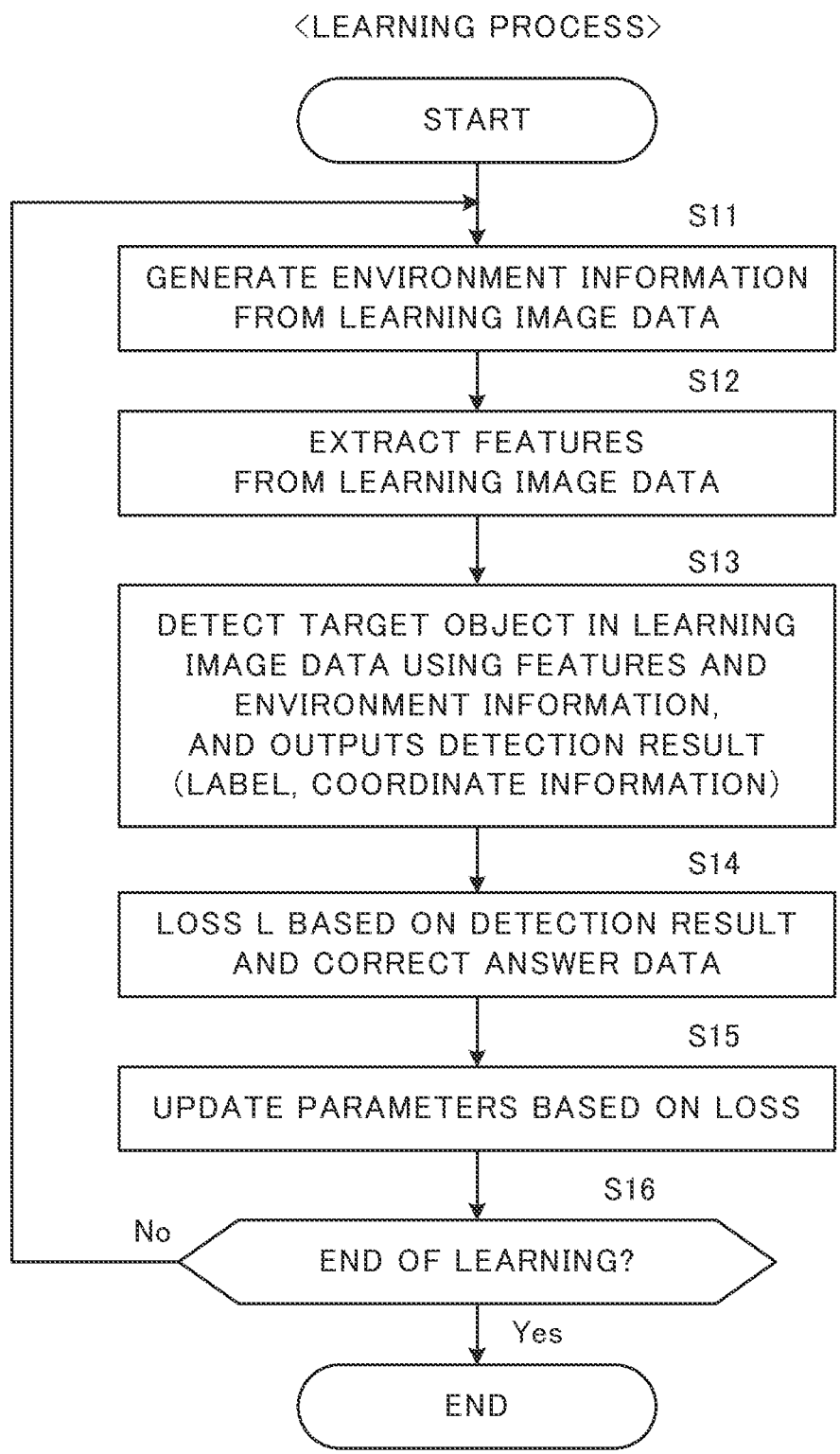
FIG. 3 is a flowchart of a learning process by the learning apparatus of the first example embodiment.

Next, the learning process performed by the learning apparatus 100 of the first example embodiment will be described. FIG. 3 is a flowchart of the learning process performed by the learning apparatus 100 of the first example embodiment. This process is conducted by the processor 13, which is illustrated in FIG. 1, executes a program prepared in advance, and operates as each element depicted in FIG. 2.

First, when the data acquisition unit 101 acquires one learning data set Dt, the environment classification unit 102 generates environment information E from learning image data included in the learning data set Dt acquired by the data acquisition unit 101 (step S11). Moreover, the feature extraction unit 103 extracts features from the same image data (step S12).

Next, the object detection unit 104 detects a target object in the learning image data using the features extracted by the feature extraction unit 103 and the environment information E generated by the environment classification unit 102, and outputs a detection result DR (step S13). This detection result DR includes a label and coordinate information for each detected object. Next, the loss calculation unit 105 calculates a loss L based on the detection result DR and the environment information E supplied from the environment classification unit 102 (step S14). Specifically, the loss calculation unit 105 calculates the regression loss and the classification loss for each target object in the learning image data. After that, the update unit 106 updates parameters of the neural network forming the feature extraction unit 103 and the object detection unit 104 based on the loss L (step S15).

Next, it is determined whether or not the learning is terminated, that is, an end condition of a predetermined learning is provided (step S16). The end condition of the learning may be, for instance, that all of the prepared learning data sets are used, that the number of times of updating the parameters by the update unit 106 reaches a predetermined number of times, and the like. When it is determined that the learning is not completed (step S16: No), the process returns to step S11, and processes of steps S11 to S15 are performed using a next learning data set Dt. On the other hand, when it is determined that the learning is completed (step S16: Yes), the learning process is terminated.

(2) Object Detection Apparatus

Figure 4:
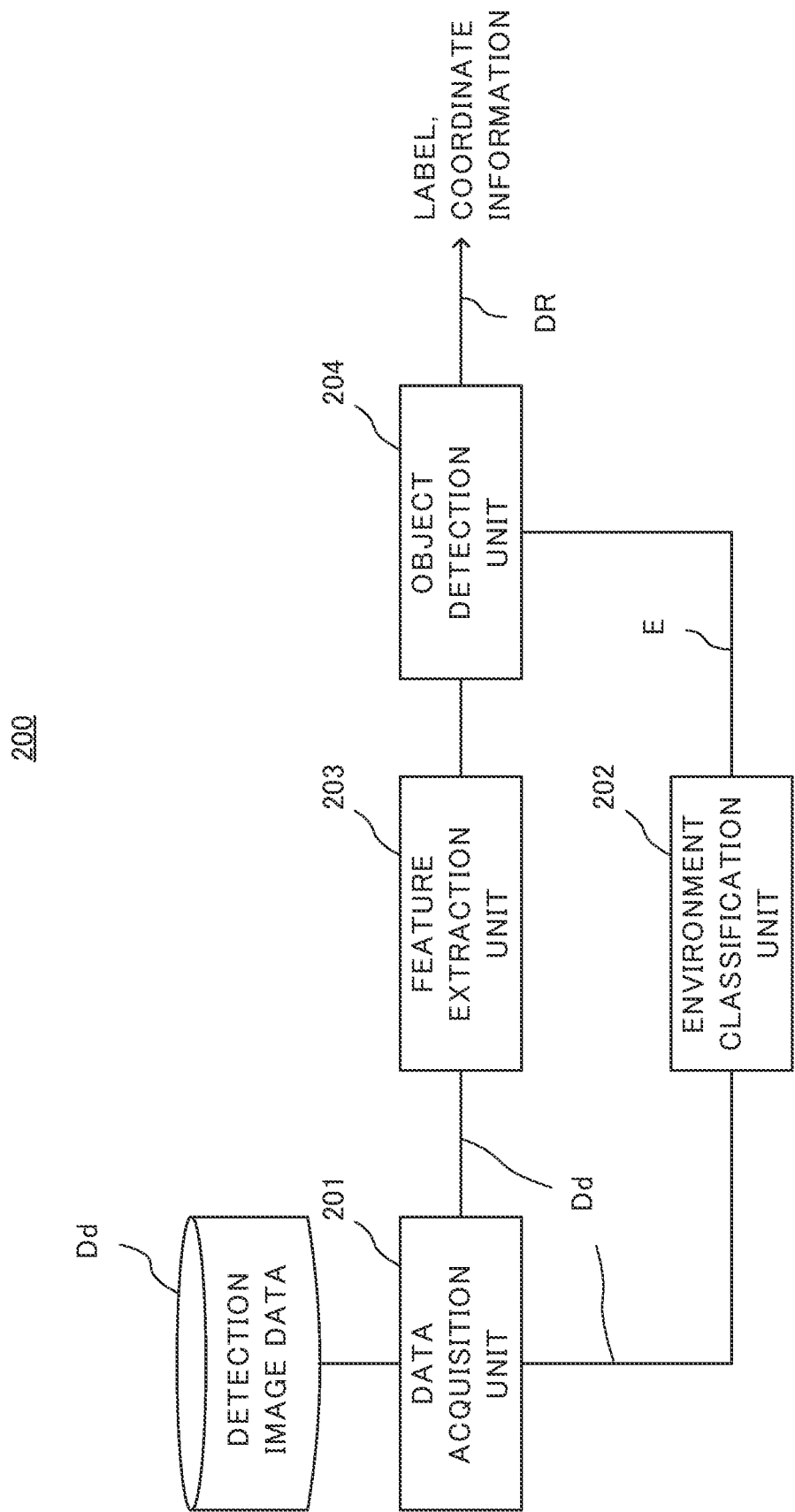
FIG. 4 illustrates a functional configuration of an object detection apparatus according to the first example embodiment.

Next, a functional configuration of an object detection apparatus will be described according to the first example embodiment. FIG. 4 is a block diagram illustrating the functional configuration of an object detection apparatus 200 according to the first example embodiment. The object detection apparatus 200 includes a data acquisition unit 201, an environment classification unit 202, a feature extraction unit 203, and an object detection unit 204. The environment classification unit 202 is formed similarly to the environment classification unit 102 of the learning apparatus 100 illustrated in FIG. 2. Also, the feature extraction unit 203 and the object detection unit 204 have been learned by the learning apparatus 100 illustrated in FIG. 2, that is, the parameters have been updated by the learning process described above.

The data acquisition unit 201 acquires image data (hereinafter, referred to as "detection image data") Dd that is a subject of the object detection, and supplies the image data to the environment classification unit 202 and the feature extraction unit 203. The environment classification unit 202 generates the environment information E from the detection image data Dd, and supplies the environment information E to the object detection unit 204. The feature extraction unit 203 extracts features from the detection image data Dd, and supplies the features to the object detection unit 204. The object detection unit 204 performs an object detection using an object detection model trained by the learning process based on the features extracted by the feature extraction unit 203 and the environment information E generated by the environment classification unit 202, and outputs the detection result DR. The detection result DR indicates a label and coordinate information for each of one or more target objects included in the detection image data Dd. In the above configuration, the environment classification unit 202 is an example of an environment information generation unit, and the feature extraction unit 203 and the object detection unit 204 are example elements of a detection unit.

Figure 5:
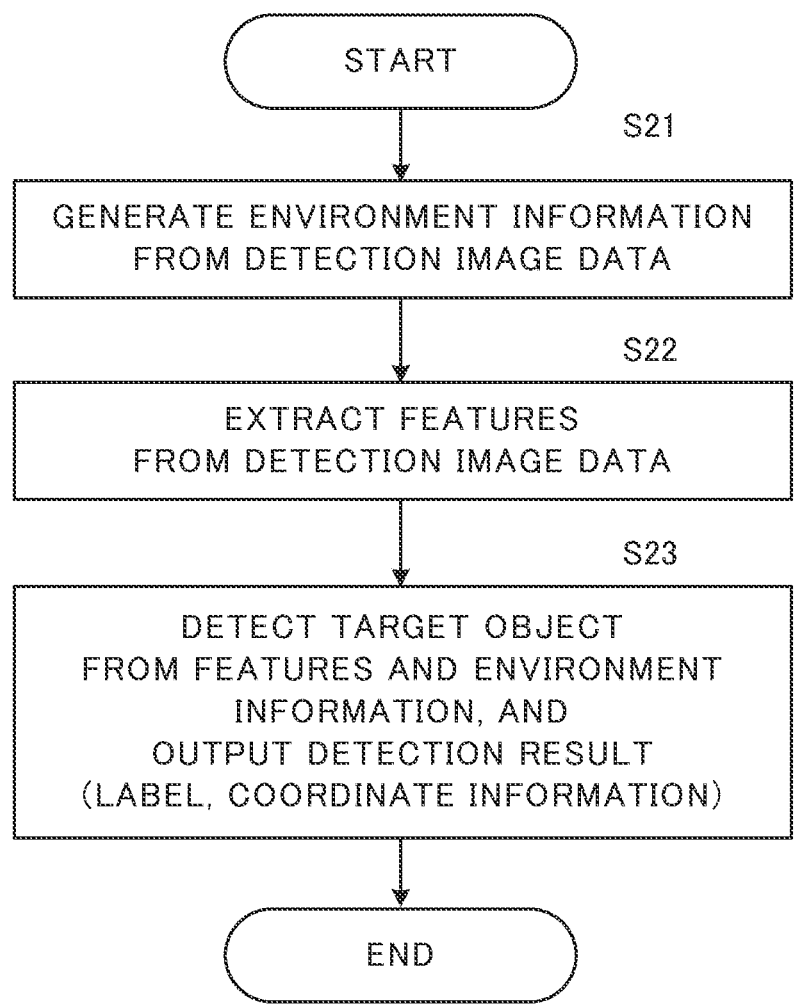
FIG. 5 is a flowchart of an object detection process by the object detection apparatus according to the first example embodiment.

Next, an object detection process by the object detection apparatus 200 of the first example embodiment will be described. FIG. 5 is a flowchart of an object detection process performed by the object detection apparatus 200 of the first example embodiment. This process is conducted by the processor 13, which is illustrated in FIG. 1, executes a program prepared in advance, and operates as each element depicted in FIG. 4.

First, when the data acquisition unit 201 acquires the detection image data Dd, the environment classification unit 202 generates the environment information E from the detection image data Dd (step S21). Moreover, the feature extraction unit 203 extracts features from the detection image data Dd (step S22). Next, the object detection unit 204 detects each target object included in the detection image data Dd based on the features extracted by the feature extraction unit 203 and the environment information generated by the environment classification unit 202, and outputs a label and the coordinate information for each detected target object as the detection result DR (step S23). After that, the process is terminated.

SECOND EXAMPLE EMBODIMENT

Next, a second example embodiment will be described. In the second example embodiment, an object detection apparatus outputs environment information in addition to a label and coordinate information as a detection result for image data. Accordingly, learning is performed using the environment information generated by the environment classification unit as correct answer data.

(1) Learning Apparatus

Figure 6:
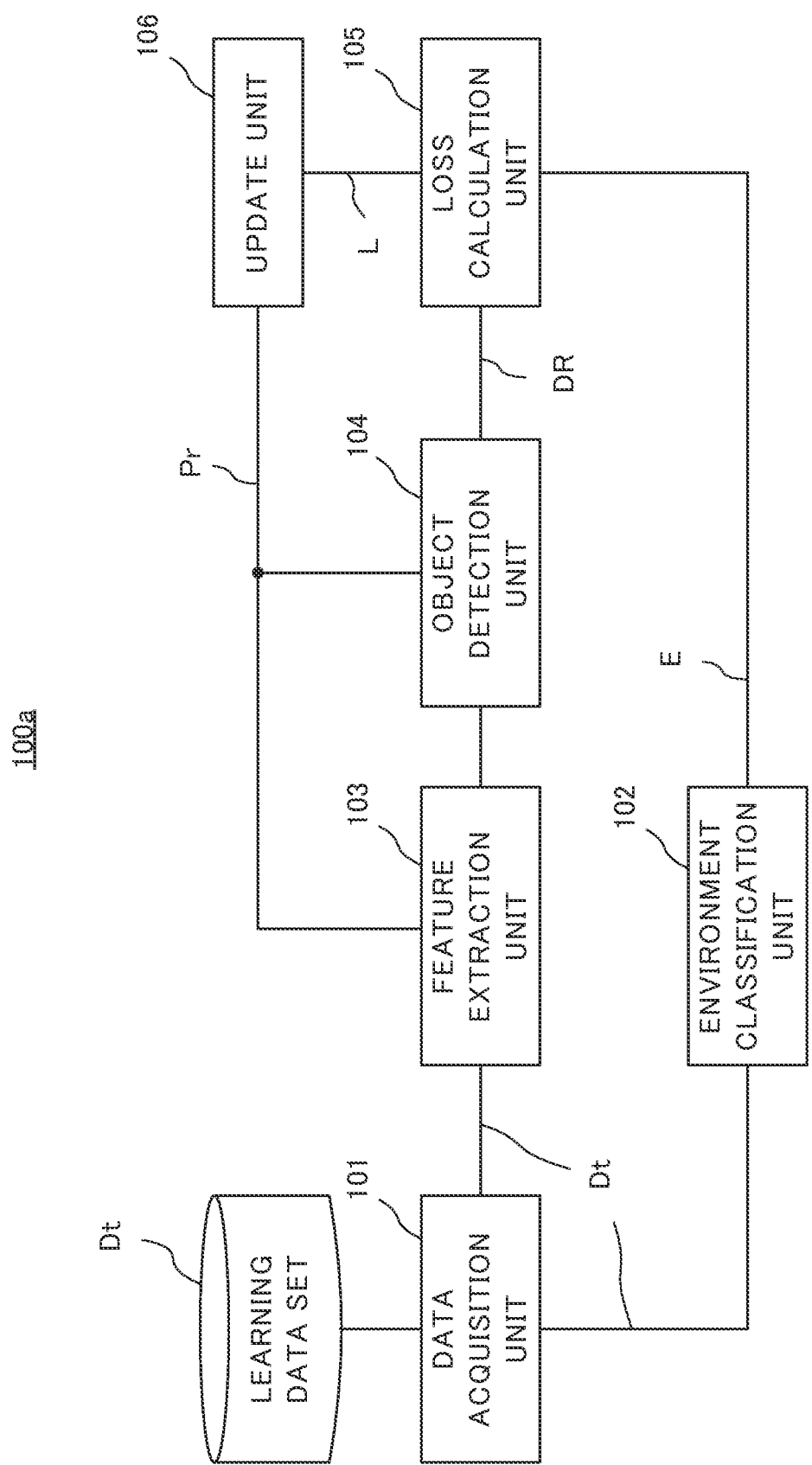
FIG. 6 illustrates a functional configuration of a learning apparatus that trains an object detection apparatus according to a second example embodiment.

First, a functional configuration of a learning apparatus of the second example embodiment will be described. FIG. 6 is a block diagram illustrating a functional configuration of a learning apparatus 100a for training the object detection apparatus according to the second example embodiment. The learning apparatus 100a basically has the same configuration as the learning apparatus 100 of the first example embodiment, and includes a data acquisition unit 101, an environment classification unit 102, a feature extraction unit 103, an object detection unit 104, a loss calculation unit 105, and an update unit 106. However, in the second example embodiment, the environment information E generated by the environment classification unit 102 is input to the loss calculation unit 105, and is used as the correct answer data.

In the second example embodiment, the learning data set Dt used for learning is the same as in the first example embodiment. That is, the learning data set Dt includes the learning image data and the correct answer data of a label and coordinates for each target object included in the image data.

Operations of the data acquisition unit 101, the environment classification unit 102, and the object detection unit 104 are basically the same as those of the first example embodiment. That is, the data acquisition unit 101 acquires the learning data set Dt, and supplies the learning data set Dt to the environment classification unit 102 and the feature extraction unit 103. The environment classification unit 102 generates the environment information E based on the image data included in the learning data set Dt. However, the environment classification unit 102 supplies the generated environment information E to the loss calculation unit 105 as the correct answer data of the environment information.

The feature extraction unit 103 extracts features from the learning image data, and supplies the features to the object detection unit 104. The object detection unit 104 detects one or more target objects included in the learning image data using the features extracted by the feature extraction unit 103. The feature extraction unit 103 and the object detection unit 104 are formed by a neural network that performs an object detection using a predetermined object detection model. Here, in the second example embodiment, the object detection unit 104 also detects "environment information" concerning each target object included in the image data. The "environment information" indicates an environment related to the image data, and details thereof will be described later. Accordingly, the neural network forming the object detection unit 104 includes a configuration for outputting the environment information in addition to each label and the coordinate information in an output layer. After that, as the detection result DR, the object detection unit 104 outputs each label, the coordinate information, and the environment information for the one or more target objects detected from the image data to the loss calculation unit 105.

The loss calculation unit 105 calculates a loss L between the detection result DR supplied from the object detection unit 104 and the correct answer data, and supplies the loss L to the update unit 106. As described above, the detection result DR includes the label, the coordinate information, and the environment information for each of target objects. On the other hand, as the correct answer data, the learning data set Dt includes the label and coordinates for each of the target objects, and the correct answer data of the environment information are supplied from the environment classification unit 102. Accordingly, first similarly to the first example embodiment, the loss calculation unit 105 calculates a classification loss between the label output by the object detection unit 104 as the detection result DR and a correct answer label included in the correct answer data, and calculates a regression loss between the coordinate information output by the object detection unit 104 as the detection result DR and the coordinate information included in the correct answer data. In addition, the loss calculation unit 105 calculates a loss (hereinafter, referred to as "environment loss") between the environment information output by the object detection unit 104 as the detection result DR and the environment information E supplied from the environment classification unit 102. After that, the loss calculation unit 105 supplies the loss L including the classification loss, the regression loss, and the environment loss to the update unit 106.

The update unit 106 updates parameters of the object detection model formed by the feature extraction unit 103 and the object detection unit 104, so that the loss L supplied from the loss calculation unit 105, that is, the classification loss, the regression loss, and the environment loss are reduced. Then, the update unit 106 supplies the updated parameters Pr to the feature extraction unit 103 and the object detection unit 104. By this manner, the learning apparatus 100a trains the object detection model formed by the feature extraction unit 103 and the object detection unit 104.

Figure 7:
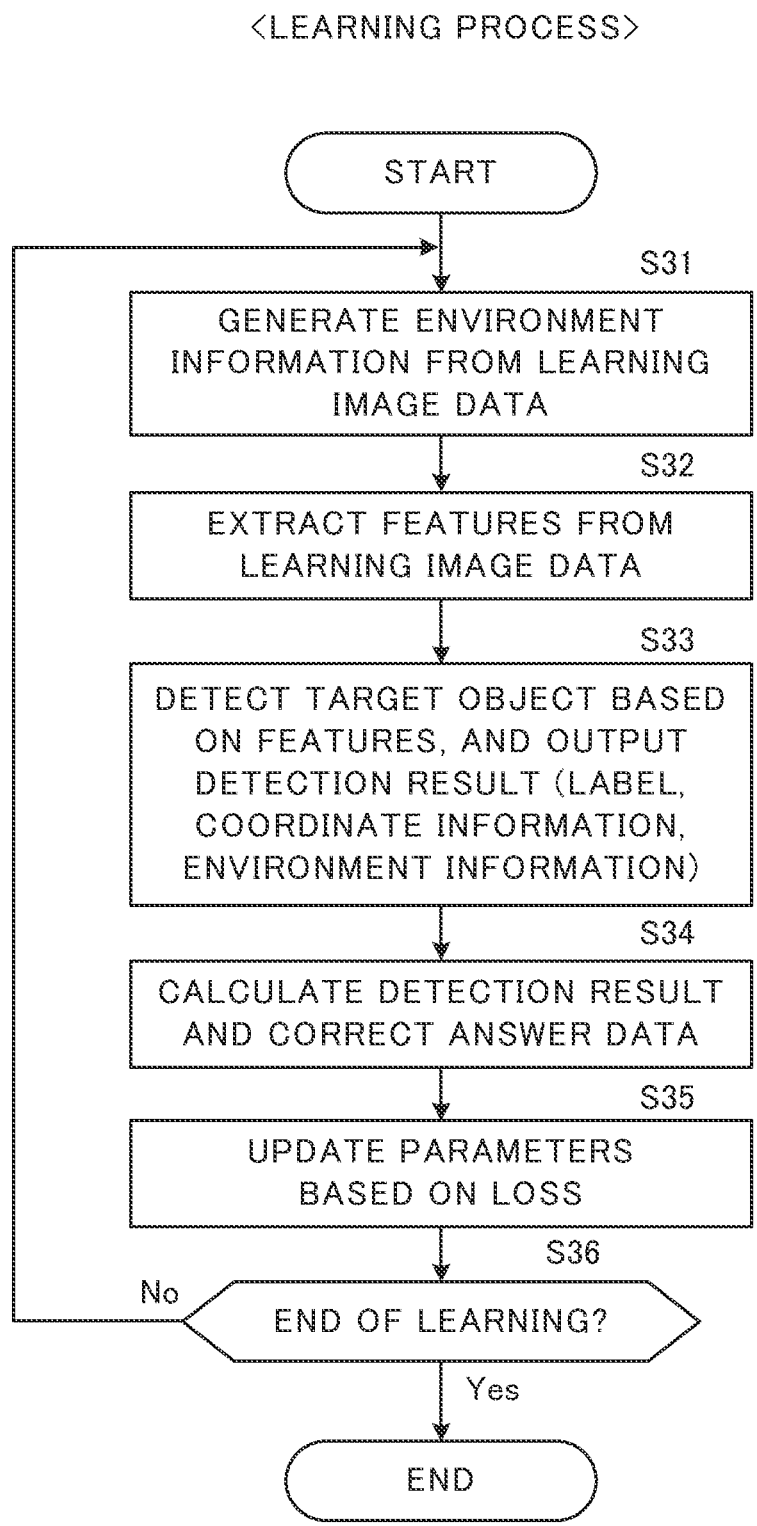
FIG. 7 is a flowchart of the learning process by the learning apparatus according to the second example embodiment.

Next, the learning process performed by the learning apparatus 100a will be described according to the second example embodiment. FIG. 7 is a flowchart of the learning process performed by the learning apparatus 100a according to the second example embodiment. This process is conducted by the processor 13, which is illustrated in FIG. 1, executes a program prepared in advance, and operates as each element depicted in FIG. 6.

First, when the data acquisition unit 101 acquires one learning data set Dt, the environment classification unit 102 generates the environment information E from the learning image data included in the learning data set Dt acquired by the data acquisition unit 101 (step S31). Also, the feature extraction unit 103 extracts features from the same image data (step S32). Next, the object detection unit 104 detects each target object in the learning image data using the features extracted by the feature extraction unit 103, and outputs the detection result DR including a label, coordinate information, and environment information for each target object (step S33).

Next, the loss calculation unit 105 calculates a loss L using the detection result DR, the correct answer data of labels and coordinates included in the learning data set Dt, and the environment information E supplied from the environment classification unit 102 (step S34). Accordingly, the update unit 106 updates the parameters of the neural network forming the feature extraction unit 103 and the object detection unit 104 based on the loss L (step S35).

Next, it is determined whether or not the learning ends, that is, an end condition of the predetermined learning is provided (step S36). When it is determined that the learning does not end (step S36: No), this process returns to step S31, and processes of steps S31 to S35 are performed using a next learning data set Dt. On the other hand, when it is determined that the learning ends (step S36: Yes), the learning process is terminated.

(2) Object Detection Apparatus

Figure 8:
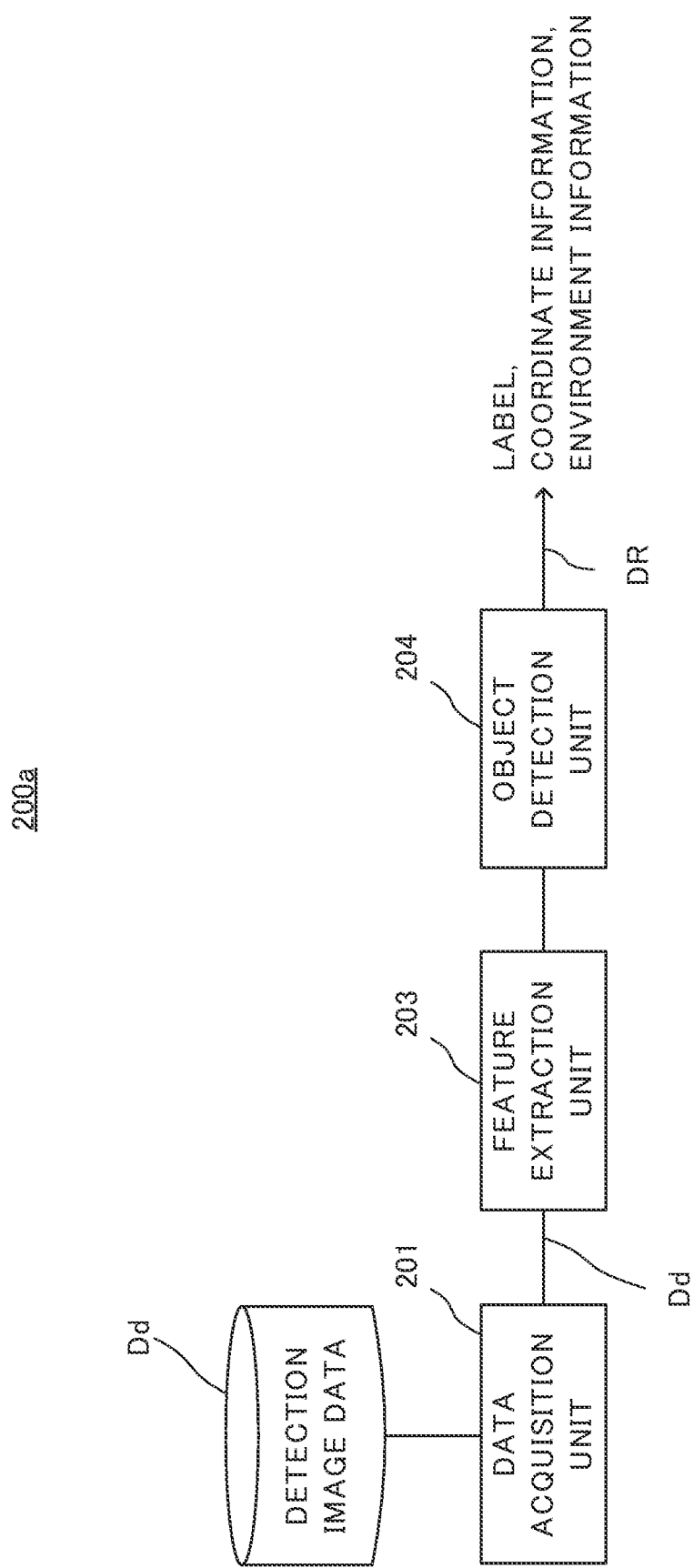
FIG. 8 illustrates a functional configuration of the object detection apparatus according to the second example embodiment.

Next, a functional configuration of the object detection apparatus will be described according to the second example embodiment. FIG. 8 is a block diagram illustrating a functional configuration of an object detection apparatus 200a according to the second example embodiment. The object detection apparatus 200a includes the data acquisition unit 201, the feature extraction unit 203, and the object detection unit 204. The feature extraction unit 203 and the object detection unit 204 have been trained by the learning apparatus 100a illustrated in FIG. 6, that is, the parameters have been updated by the learning process described above.

The data acquisition unit 201 acquires the detection image data Dd, and supplies the detection image data Dd to the feature extraction unit 203. The feature extraction unit 203 extracts features from the detection image data Dd, and supplies the features to the object detection unit 204. The object detection unit 204 performs an object detection using the object detection model trained by the learning process based on the features extracted by the feature extraction unit 203, and outputs a detection result DR. The detection result DR includes a label, coordinate information, and environment information for each of the one or more target objects included in the detection image data Dd.

Figure 9:
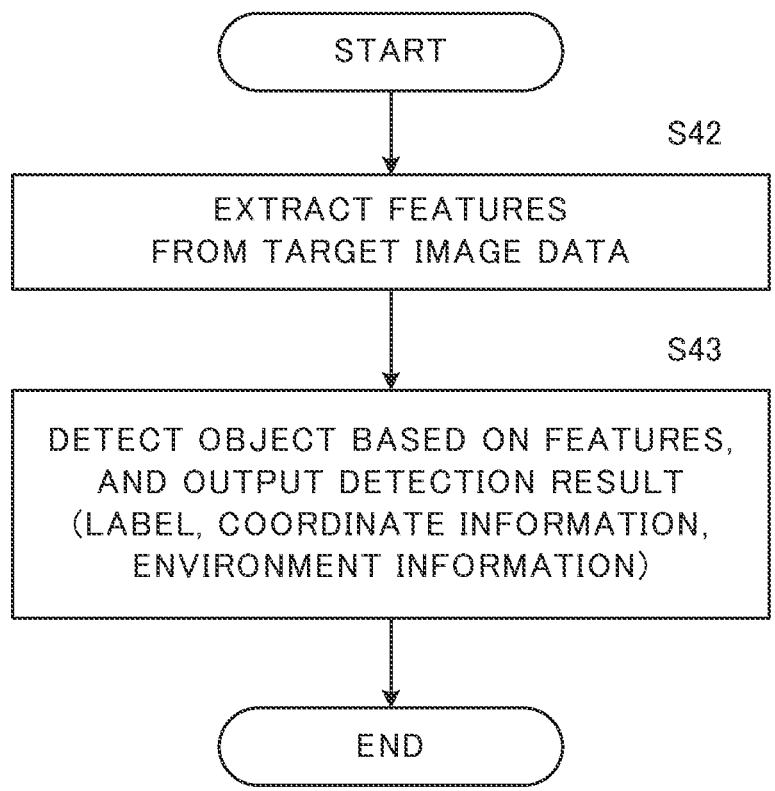
FIG. 9 is a flowchart of an object detection process by the object detection apparatus according to the second example embodiment.

Next, the object detection processing by the object detection apparatus 200a of the second example embodiment will be described. FIG. 9 is a flowchart of an object detection process performed by the object detection apparatus 200a according to the second example embodiment. This process is conducted by the processor 13, which is illustrated in FIG. 1, executes a program prepared in advance, and operates as each element depicted in FIG. 8.

First, when the data acquisition unit 201 acquires the detection image data Dd, the feature extraction unit 203 extracts features from the detection image data Dd (step S42). Next, the object detection unit 204 detects each target object included in the detection image data Dd based on the features extracted by the feature extraction unit 203, and outputs a label, coordinate information, and environment information for each target object as the detection result DR (step S43). After that, this process is terminated.

Environment Classification

Next, a process performed by the environment classification unit 102 will be described. Since an image used for object detection is usually taken by a camera or the like, features included in the image are affected by a photographing environment. For instance, features included in an image, especially a background of the image, differ depending on whether the photographing environment is the daytime or nighttime, indoors or outdoors, front light or back light, or the like. For instance, a white cane is generally a white stick; however, it becomes a black stick in back lighting.

And, even under the same photographing environment, features of an object differ according to a photographing angle. For instance, even for the same bicycle, an appearance differs between a case of photographing from a front and a case of photographing from a side, and features included in respective images are different. Moreover, even under the same photographing environment, an appearance differs depending on a type and a variation of each of individual objects, and features included in an image may be different for each image. For instance, even with the same backpack, there are a black backpack, a white backpack, a different shape of a backpack, and the like, so each of the features included in the image will be different. Accordingly, the environment classification unit 102 generates environment information indicating features concerning an environment from image data, and performs the object detection by using the environment information, so as to absorb influences of environmental differences on images.

Figure 10:
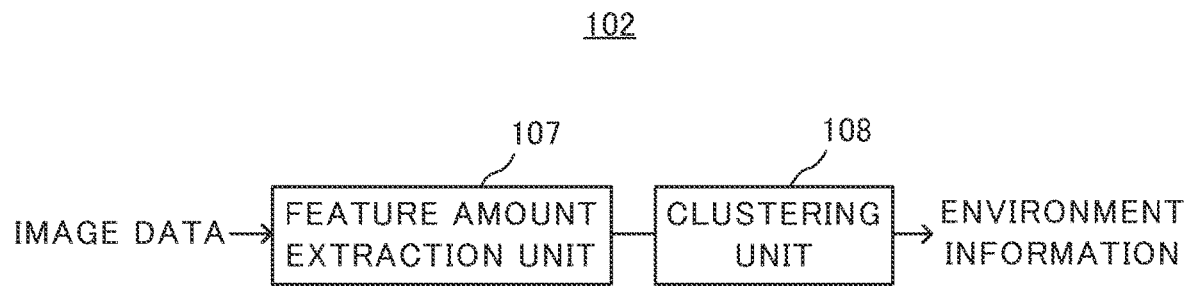
FIG. 10 is a block diagram illustrating a configuration of an environment classification unit.

FIG. 10 is a block diagram illustrating a configuration of the environment classification unit 102. The environment classification unit 102 includes a feature amount extraction unit 107 and a clustering unit 108. The feature amount extraction unit 107 extracts a feature amount in the image data. As the feature amount, a color feature amount, a Sift (Scale Invariant Feature Transform)-BoF (Bag of Features) feature amount, a VGG16 feature amount, or the like may be used. The clustering unit 108 performs clustering based on the feature amount extracted by the feature amount extraction unit 107, and generates environment information. As the technique of the clustering, a K-means method, a shortest range method, a least variance method, or the like may be used.

Figure 11:
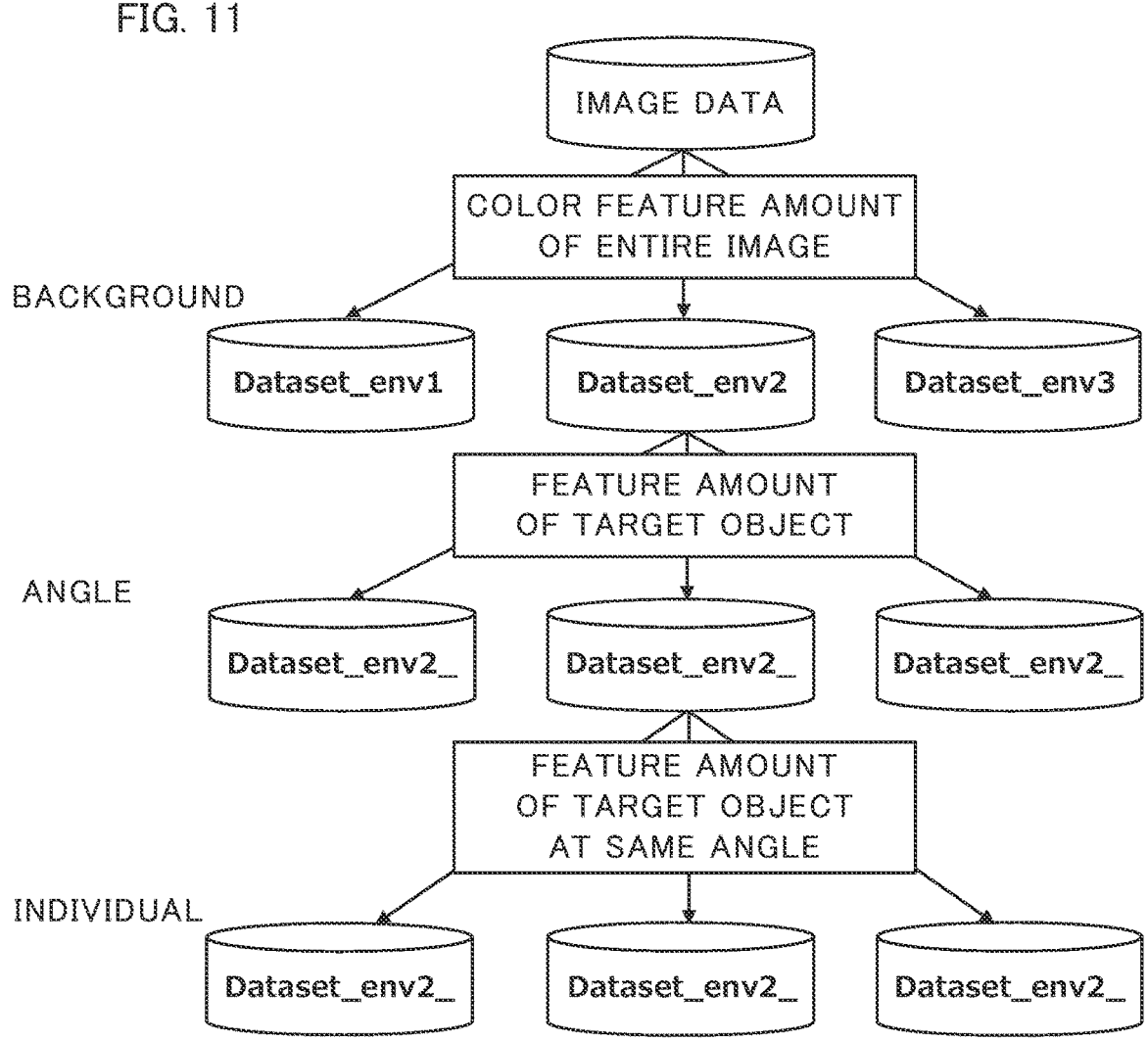
FIG. 11 illustrates a classification example of environment information by the environment classification unit.

FIG. 11 illustrates a classification example of the environment information by the environment classification section 102. In this example, information of a "background", an "angle" and an "individual" is generated as the environment information from image data. Here, the "background" indicates an area in which a target object is absence in the image data. The "angle" indicates an angle of a camera in an area of the target object detected in the image data, that is, the photographing angle. The "individual" indicates a variation of a type of an object detected as a target object, specifically, a difference in shape or in color for the same object.

In the example of FIG. 11, the environment classification unit 102 first extracts a color feature amount of the entire image, and classifies the image according to a background using the color feature amount. By this process, for instance, it is classified whether the image shows the daytime, the nighttime, indoors, outdoors, or the like. Next, the environment classification unit 102 classifies an angle for each image classified based on the background by using a feature amount of a foreground of the image, that is, a feature amount of a target object. Since each area of one or more target objects included in the image is extracted by the object detection, the feature amount is extracted for each area of the target objects, and a classification according to the photographing angle is performed. Furthermore, the environment classification unit 102 extracts an area of each target object classified by the angle, that is, a feature amount of a target object captured at the same angle, and classifies the target object by individual. By this process, for a plurality of target objects captured at the same angle, a classification is performed for individual objects in accordance with variations such as the shape, color, or the like. Therefore, it is possible to classify one image based on a background, an angle, and an individual. Incidentally, the environment information concerning the entire image as in the above-described "background" is referred to as "overall environment information", and the environment information for each area of the target objects in the image as in the "angle" and "individual" is referred to as "local environment information".

As described above, the environment information is generated by the process of the environment classification unit 102; however, instead, a person may look at an image, classifies the image, and prepares the environment information.

SECOND EXAMPLE EMBODIMENT

Figure 12A:
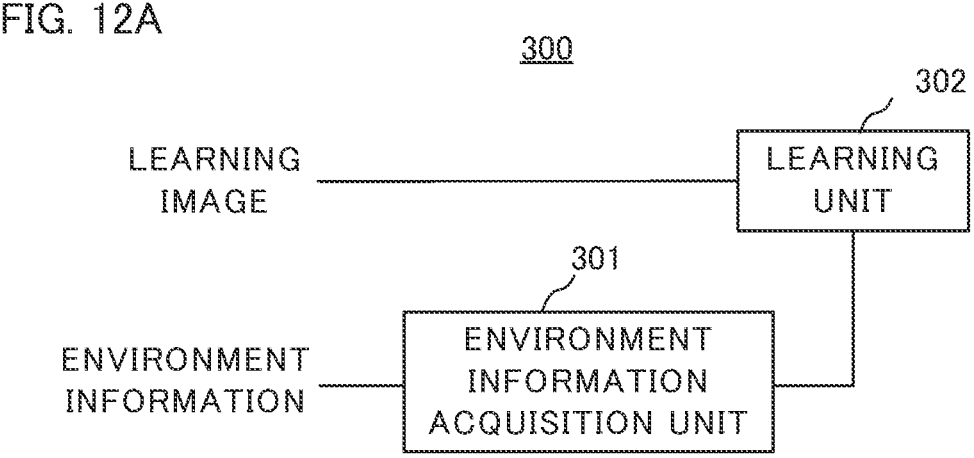
FIG. 12A, FIG. 12B, and FIG. 12C illustrate functional configurations of the learning apparatus and the object detection apparatus according to the second example embodiment.

Next, a second example embodiment of the present invention will be described.
(Learning Apparatus)
First, a learning apparatus that performs learning of an object detection apparatus will be described according to the second example embodiment. FIG. 12A is a block diagram illustrating a functional configuration of a learning apparatus 300 according to the second example embodiment. A hardware configuration of the learning apparatus 300 is the same as that illustrated in FIG. 1.

Figure 12B:
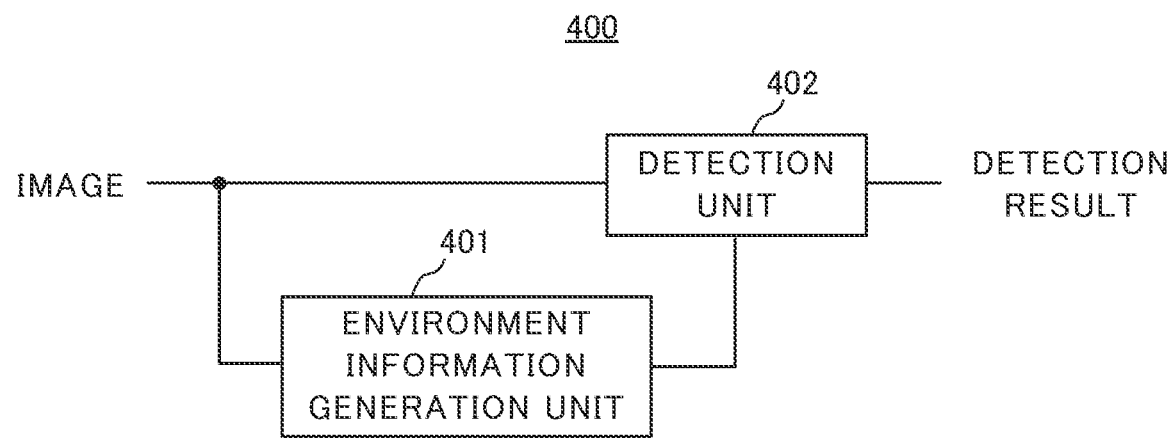

As illustrated, the learning apparatus 300 includes an environment information acquisition unit 301 and a learning unit 302. The environment information acquisition unit 301 acquires environment information concerning a learning image. The learning unit 302 performs learning of an object detection model for detecting each target object included in the learning image using the environment information.
(Object Detection Apparatus)
Next, an object detection apparatus will be described according to the second example embodiment. FIG. 12B is a block diagram illustrating a functional configuration of an object detection apparatus 400 according to a first example embodiment of the second example embodiment. Incidentally, a hardware configuration of the object detection apparatus 400 is the same as that illustrated in FIG. 1.

As illustrated, the object detection apparatus 400 includes an environment information generation unit 401 and a detection unit 402. An image to be a subject to the object detection process is input to the environment information generation unit 401 and the detection unit 402. The environment information generation unit 401 generates environment information from the image of a process subject, and outputs the environment information to the detection unit 402. The detection unit 402 detects each target object included in the image of the process subject using the environment information input from the environment information generation unit 401, and outputs a detection result.

Figure 12C:
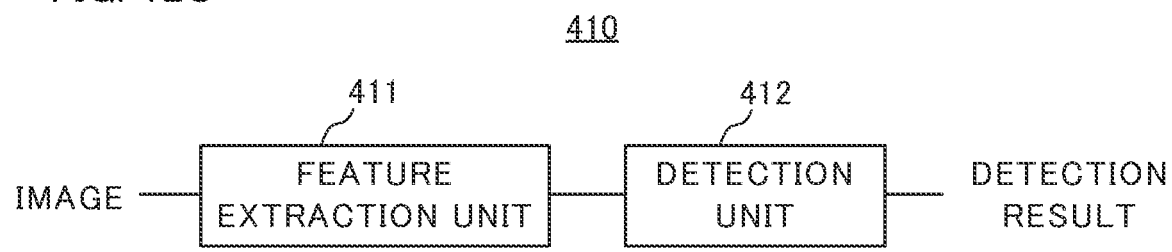

FIG. 12C is a block diagram illustrating a functional configuration of an object detection apparatus 410 according to the second example embodiment of the second example embodiment. Incidentally, a hardware configuration of the object detection apparatus 410 is the same as that illustrated in FIG. 1.

As illustrated, the object detection apparatus 410 includes a feature extraction unit 411 and a detection unit 412. An image to be a subject to the object detection process is input to the feature extraction unit 411. The feature extraction unit 411 extracts features from the image, and outputs the features to the detection unit 412. The detection unit 412 detects each target object included in the image based on the extracted features, and outputs a detection result including a label, coordinate information, and environment information for each target object.

A part or all of the example embodiments described above may also be described as the following supplementary notes, but not limited thereto.
(Supplementary Note 1)
1. A learning apparatus comprising:
an environment information acquisition unit configured to acquire environment information concerning a learning image; and
a learning unit configured to train an object detection model that detects each target object included in the learning image, by using the environment information.
(Supplementary Note 2)
2. The learning apparatus according to supplementary note 1, wherein the learning unit includes
a detection unit configured to detect each target object included in the learning image by the object detection model based on the environment information and output a detection result; and
an update unit configured to update parameters of the detection unit based on the detection result and correct answer data corresponding to the learning image.
(Supplementary Note 3)
3. The learning apparatus according to supplementary note 2, wherein the detection unit outputs, as the detection result, a label and coordinate information for each target object, and
the update unit calculates a loss from the correct answer data based on the label and the coordinate information and updates the parameters based on the loss.
(Supplementary Note 4)
4. The learning apparatus according to supplementary note 2 or 3, wherein the detection unit is formed by a neural network, and the environment information is input as input data to the neural network.
(Supplementary Note 5)
5. The learning apparatus according to supplementary note 1, wherein the learning unit includes
a detection unit configured to detect each target object included in the learning image by the object detection model, and output a detection result, and
an update unit configured to update parameters of the detection unit based on the detection result, and correct answer data and the environment information with respect to the learning image.
(Supplementary Note 6)
6. The learning apparatus according to supplementary note 5, wherein
the detection unit outputs, as the detection result, a label, coordinate information, and environment information for each target object, and
the update unit calculates a loss from the correct answer data based on the label and the coordinate information, calculates a loss between the environment information output from the detection unit and the environment information acquired by the environment information acquisition unit, and updates the parameters based on the losses.
(Supplementary Note 7)
7. The learning apparatus according to any one of supplementary notes 1 through 6, wherein the environment information acquisition unit extracts a feature amount from the learning image, and generates the environment information by conducting clustering based on the extracted feature amount.
(Supplementary Note 8)
8. The learning apparatus according to any one of supplementary notes 1 through 7, wherein the environment information includes at least one of overall environment information representing an environment in an area of the entire learning image or an area equal to or larger than a predetermined area and local environment information representing an environment in an area of the target object.

(Supplementary Note 9)

9. A learning method, comprising:
acquiring environment information concerning a learning image; and
detecting each target object included in the learning image by using the environment information.

(Supplementary Note 10)

10. A recording medium storing a program, the program causing a computer to perform a process comprising:
acquiring environment information concerning a learning image; and
detecting each target object included in the learning image by using the environment information.

(Supplementary Note 11)

11. An object detection apparatus comprising:
an environment information generation unit configured to generate environment information from an image; and
a detection unit configured to detect each target object included in the image by using the environment information, and output a detection result.

(Supplementary Note 12)

12. The object detection apparatus according to supplementary note 11, wherein the detection unit outputs, as the detection result, a label and coordinate information for each target object.

(Supplementary Note 13)

13. The object detection apparatus according to supplementary note 12, wherein the detection unit is formed by a neural network, and the environment information is input as input data to the neural network.

(Supplementary Note 14)

14. The object detection apparatus according to any one of supplementary notes 11 through 13, wherein the environment information generation unit extracts a feature amount from the image, and generates the environment information by conducting clustering based on the extracted feature amount.

(Supplementary Note 15)

15. The object detection apparatus according to any one of supplementary notes 11 through 14, wherein the environment information generation unit includes at least one of overall environment information representing an environment in an area of the entire image or an area equal to or larger than a predetermined area and local environment information representing an environment in an area of the target object.

(Supplementary Note 16)

16. An object detection method comprising:
generating environment information from an image; and
detecting each target object included in the image by using the environment information, and outputting a detection result.

(Supplementary Note 17)

17. A recording medium storing a program, the program causing a computer to perform a process comprising:
generating environment information from an image; and
detecting each target object included in the image by using the environment information, and outputting a detection result.

(Supplementary Note 18)

18. An object detection apparatus comprising:
a feature extraction unit configured to extract features from an image; and
a detection unit configured to detect each target object included in the image based on the extracted features, and output a detection result including a label, coordinate information, and environment information for each target object.

(Supplementary Note 19)

19. An object detection method comprising:
extracting features from an image; and
detecting each target object included in the image based on the extracted features, and outputting a detection result including a label, coordinate information, and environment information for each target object.

(Supplementary Note 20)

20. A recording medium storing a program, the program causing a computer to perform a process comprising:
extracting features from an image; and
detecting each target object included in the image based on the extracted features, and outputting a detection result including a label, coordinate information, and environment information for each target object.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS 10, 200, 200a, 400 Object detection apparatus
100, 100a, 300 Learning apparatus
101, 201 Data acquisition unit
102, 202 Environment classification dept
103, 203 Feature extraction unit
104, 204 Object detection unit
105, 205 Loss calculation unit
106 Update unit
107 Feature amount extraction unit
108 Clustering unit

What is claimed is:

1. A learning apparatus comprising:
a first memory storing instructions; and
one or more first processors configured to execute the instructions to:
acquire environment information concerning a learning image; and
train an object detection model that detects each target object included in the learning image, by using the environment information,
wherein the first processor, in executing the instruction to train the object detection model:
detects each target object included in the learning image by the object detection model based on the environment information and outputs a detection result; and
updates parameters of the detection model based on the detection result and corrects answer data corresponding to the learning image.

2. The learning apparatus according to claim 1, wherein the first processor
outputs, as the detection result, a label and coordinate information for each target object, and calculates a loss from the correct answer data based on the label and the coordinate information and updates the parameters based on the loss.

3. The learning apparatus according to claim 1, wherein the first processor uses a neural network, and the first processor inputs the environment information as input data to the neural network.

4. The learning apparatus according to claim 1, wherein the first processor extracts a feature amount from the learning image, and generates the environment information by conducting clustering based on the extracted feature amount.

5. The learning apparatus according to claim 1, wherein the environment information includes at least one of overall environment information representing an environment in an area of the entire learning image or an area equal to or larger than a predetermined area and local environment information representing an environment in an area of the target object.

6. An object detection apparatus, which corresponds to the learning apparatus according to claim 1, the object detection apparatus comprising:
a second memory storing instructions; and
one or more second processors configured to execute the instructions to:
generate environment information from an image; and
detect each target object included in the image by using the environment information, and output a detection result.

7. The object detection apparatus according to claim 6, wherein the second processor outputs, as the detection result, a label and coordinate information for each target object.

8. The object detection apparatus according to claim 7, wherein the second processor uses a neural network, and the second processor inputs environment information as input data to the neural network.

9. The object detection apparatus according to claim 6, wherein the second processor extracts a feature amount from the image, and generates the environment information by conducting clustering based on the extracted feature amount.

10. The object detection apparatus according to claim 6, wherein the environment information includes at least one of overall environment information representing an environment in an area of the entire image or an area equal to or larger than a predetermined area and local environment information representing an environment in an area of the target object.

11. A learning apparatus comprising:
a first memory storing instructions; and
one or more first processors configured to execute the instructions to:
acquire environment information concerning a learning image; and
train an object detection model that detects each target object included in the learning image, by using the environment information,
wherein the first processor, in executing the instruction to train the object detection model:
detects each target object included in the learning image by the object detection model, and outputs a detection result, and
updates parameters of the detection model based on the detection result, and corrects answer data and the environment information with respect to the learning image.

12. The learning apparatus according to claim 11, wherein the first processor outputs, as the detection result, a label, coordinate information, and environment information for each target object, and
the first processor calculates a loss from the correct answer data based on the label and the coordinate information, calculates a loss between the environment information output in detecting each target object and the environment information acquired in acquiring the environment information, and updates the parameters based on the losses.

13. An object detection apparatus, which corresponds to the learning apparatus according to claim 11, the object detection apparatus comprising:
a third memory storing instructions; and
one or more third processors configured to execute the instructions to:
extract features from an image; and
detect each target object included in the image based on the extracted features, and output a detection result including a label, coordinate information, and environment information for each target object.

14. A learning method comprising:
acquiring environment information concerning a learning image; and
training an object detection model that detects each target object included in the learning image by using the environment information,
wherein the training comprises:
detecting each target object included in the learning image by the object detection model based on the environment information and outputting a detection result; and
updating parameters of the detection model based on the detection result and correcting answer data corresponding to the learning image.

15. An object detection method, which corresponds to the learning method according to claim 14, the object detection method comprising:
generating environment information from an image; and
detecting each target object included in the image by using the environment information, and outputting a detection result.

16. A non-transitory computer-readable recording medium storing a learning program, the learning program causing a first computer to perform a learning process comprising:
acquiring environment information concerning a learning image; and
training an object detection model that detects each target object included in the learning image by using the environment information,
wherein the training comprises:
detecting each target object included in the learning image by the object detection model based on the environment information and outputting a detection result; and
updating parameters of the detection model based on the detection result and correcting answer data corresponding to the learning image.

17. A non-transitory computer-readable recording medium storing an object detection program, which corresponds to the learning program according to claim 16, the object detection program causing a second computer to perform an object detection process comprising:

generating environment information from an image; and detecting each target object included in the image by using the environment information, and outputting a detection result.

18. A learning method comprising:

acquiring environment information concerning a learning image; and training an object detection model that detects each target object included in the learning image by using the environment information, wherein the training comprises:

detecting each target object included in the learning image by the object detection model, and outputting a detection result, and updating parameters of the detection model based on the detection result, and correcting answer data and the environment information with respect to the learning image.

19. An object detection method, which corresponds to the learning method according to claim 18, the object detection method, comprising:

extracting features from an image; and detecting each target object included in the image based on the extracted features, and outputting a detection result including a label, coordinate information, and environment information for each target object.

20. A non-transitory computer-readable recording medium storing a learning program, the learning program causing a first computer to perform a learning process comprising:

acquiring environment information concerning a learning image; and training an object detection model that detects each target object included in the learning image by using the environment information, wherein the training comprises:

detects each target object included in the learning image by the object detection model, and outputs a detection result, and updates parameters of the detection model based on the detection result, and correct corrects answer data and the environment information with respect to the learning image.

21. A non-transitory computer-readable recording medium storing an object detection program, which corresponds to the learning program according to claim 20, the object detection program causing a third computer to perform an object detection process comprising:

extracting features from an image; and detecting each target object included in the image based on the extracted features, and outputting a detection result including a label, coordinate information, and environment information for each target object.

* * * * *